(12) United States Patent
Nuuja et al.

(10) Patent No.: US 8,224,073 B2
(45) Date of Patent: Jul. 17, 2012

(54) SYSTEM AND METHOD FOR EFFICIENT STORAGE OF MRC IMAGES FOR EASY CLASSIFICATION AND RETRIEVAL

(75) Inventors: Robert Eero Nuuja, Rochester, NY (US); Francis Kapo Tse, Rochester, NY (US); Amal Z. Malik, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 560 days.

(21) Appl. No.: 12/511,564

(22) Filed: Jul. 29, 2009

(65) Prior Publication Data
US 2011/0026814 A1   Feb. 3, 2011

(51) Int. Cl.
*G06K 9/34* (2006.01)
(52) U.S. Cl. ................................. 382/164; 382/305
(58) Field of Classification Search .......... 382/162–167, 382/305–306, 173, 176, 180, 282–284; 358/1.9, 358/2.1, 538–540, 1.13
See application file for complete search history.

(56) References Cited

U.S. PATENT DOCUMENTS

| | | | |
|---|---|---|---|
| 7,218,414 B2 * | 5/2007 | Nakao | 358/1.9 |
| 7,236,641 B2 | 6/2007 | Curry et al. | |
| 7,242,802 B2 | 7/2007 | Curry et al. | |
| 7,302,097 B2 | 11/2007 | Bai et al. | |
| 7,356,183 B2 * | 4/2008 | Curry et al. | 382/173 |
| 7,376,272 B2 | 5/2008 | Fan et al. | |
| 7,403,661 B2 | 7/2008 | Curry et al. | |
| 7,456,982 B2 * | 11/2008 | Curry et al. | 358/1.13 |
| 2007/0253620 A1 | 11/2007 | Nagarajan et al. | |

* cited by examiner

*Primary Examiner* — Ishrat I Sherali
(74) *Attorney, Agent, or Firm* — Pillsbury Winthrop Shaw Pittman LLP

(57) ABSTRACT

A method and system for processing image data provides associated background metadata in a searchable format and reduces file size. MRC techniques are used to process input image data. It is known that the image data may be segmented to generate a background layer representing background attributes of the input image data. A background color value of the background layer is detected, and background metadata representing the color value is generated. The background metadata is associated with the image data (e.g., as a separate file, in the image header, etc.), thereby making the background metadata searchable and reducing the file size of the image data to be stored.

21 Claims, 3 Drawing Sheets

SYSTEM AND METHOD FOR EFFICIENT STORAGE OF MRC IMAGES FOR EASY CLASSIFICATION AND RETRIEVAL

BACKGROUND

1. Field

The present disclosure is generally related to a method of improving storage of image data in digital printing or scanning. More specifically, the present disclosure relates to a method of storing image data manipulated by mixed-raster content (MRC) segmentation processes for improved classification and retrieval of image data.

2. Description of Related Art

Before image data is stored (and later output) to a digital output device, the image data is preferably compressed, i.e., coded to minimize the space needed to store and output the image data. In particular, due its large size, digital image data that is output to a device such as a multi-function printer (e.g., for copying and/or printing) demands typically require compression. For color or grayscale image data that is to be compressed, conversion of such image data to binary image data is generally not sufficient.

One technique for manipulating digital image data includes segmentation (or auto-segmentation). Segmenting image data into two or more planes tends to improve compression of the image, and also allows different compression methods to be applied to the different planes. For example, it is generally known in the art that a format such as mixed raster content (MRC) (also referred to as multiple raster content) may be used by digital multifunction devices to manipulate and compress image data. Such MRC compression models are becoming increasingly popular for image storage or archiving, especially for text documents and forms because of their increased compressibility. However, when archiving the forms or documents on a large scale, it can later become difficult to extract forms of similar characteristics from memory storage in an efficient manner.

Therefore, a simpler, yet effective method for compressing and storing image data using MRC segmentation techniques in order to ease retrieval of images for output is desirable.

SUMMARY

One aspect of this disclosure includes a processor-implemented method for processing image data. The method includes the following acts implemented by a processor:

segmenting input image data to generate: (i) a background layer representing background attributes of the input image data; (ii) a selector layer for identifying one or more foreground attributes of the input image data not included in the background layer; and (iii) one or more foreground layers representing the foreground attributes of the input image data;

detecting a background color value of the background layer;

generating background metadata representing the detected background color value, and associating the background metadata with the segmented image data, such that the associated background metadata is in a searchable format.

Another aspect of the disclosure provides a system for processing image data. The system includes: an image capture device for receiving image data and a processor configured to process the image data. The processor includes at least one module comprising code executable by the processor to implement the following acts:

segmenting the image data to generate: (i) a background layer representing background attributes of the input image data; (ii) a selector layer for identifying one or more foreground attributes of the input image data not included in the background layer; and (iii) one or more foreground layers representing the foreground attributes of the input image data;

detecting a background color value of the background layer;

generating background metadata representing the detected background color value, and associating the background metadata with the input image data, thereby reducing the file size of the MRC image data to be stored and retrieved for output, such that the associated background metadata is in a searchable format.

Other features and advantages of the present disclosure will become apparent from the following detailed description, the accompanying drawings, and the appended claims.

DETAILED DESCRIPTION

As noted above, to manipulate image data using different compression techniques, a compression format such as mixed raster content (MRC) may be used. MRC format includes image data in more than one image plane—an approach to satisfying the compression needs of differing types of data—which separates image data into a plurality of planes and separately applies an appropriate compression technique to each image plane. As is known in the art, each of the planes 10-16 shown for the image data of page 100 may also be considered layers, and, therefore, the terms "plane" and "layer" are used interchangeably herein, and should not be limiting.

Figure 1:
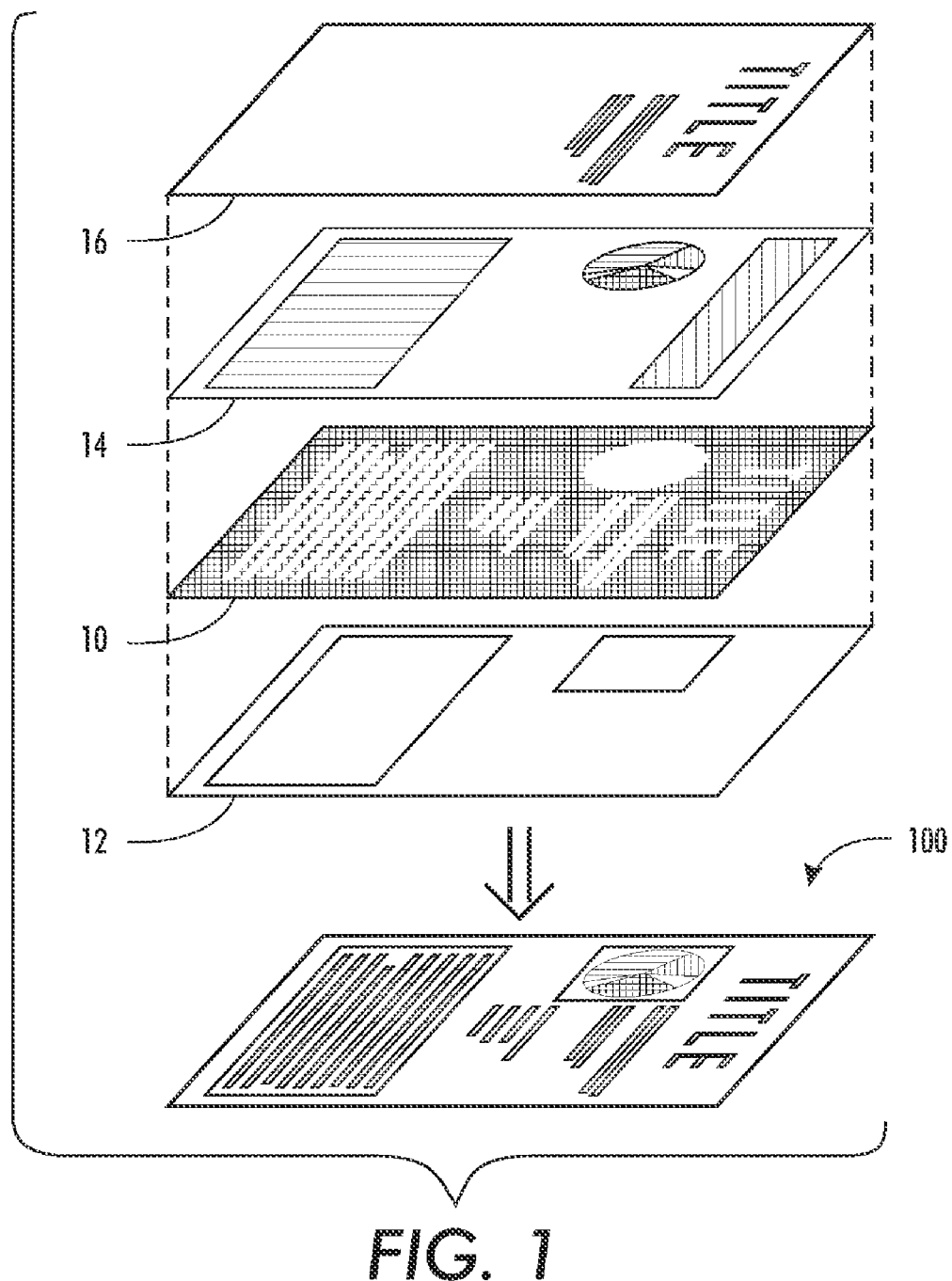
FIG. 1 illustrates an exemplary embodiment of a segmentation technique for compressing image data.

FIG. 1 illustrates an exemplary embodiment of an MRC format or segmentation technique for compressing image data representing a page 100 or document. The image data of the page 100 may be segmented into a plurality of planes including a background plane 12, at least one foreground plane 14, and an associated selector or mask plane 10. In some embodiments, one or more optional planes 16 may be provided. In some cases, optional plane 16 may be a hint plane (sometimes also referred to as a rendering plane) used to assist the rendering of the page 100 to output the content of page 100 to different displays or marking devices, for example. In other cases, for example, optional plane 16 may represent a text layer (e.g., black text).

Typically, each plane is used for holding or storing information/image data related to the page 100 or document. For example, the selector or mask plane 10 may be used to store an image of the text and line drawing information. In some instances, the mask assists in preventing identified pixels of the image data from being visible when the image data is output, thereby reducing the noise in the output image. The text may be provided and stored in a binary format. The background plane 12 may typically be used to store continuous tone (contone) information such as pictures or photos or varying background colors that are found on the page 100 of image data. The background plane 12 may also or alternatively include information that is related to the background color of the page. The foreground plane 14 may store the color of the text and/or line art (e.g., such as the colors of the ink or toner to be used). It is also generally known that the foreground plane 14 may comprise a single color. The optional plane 16 (e.g., hint or rendering plane) may be used to communicate additional information about the content of the page 100 or document. For example, a rendering plane may include color hints that identify a color matching strategy or halftone data to use for the various objects on the page.

As is generally known in the art for this type of MRC image format, any number N of foreground color and mask plane pairs 14, 10 may be provided. Thus, the planes or layers shown in FIG. 1 should not be limiting. For example, two common kinds of MRC models are 3-layer and N-layer models. Optional layer 16 of FIG. 1 may be an N-layer, for example.

In any case, segmenting the image data of the page 100 into different planes such as those noted above allows for different compression methods to apply to each of the different planes. However, it is noted that although the text and color information of a page of image data is segmented or separated differently in these models (e.g., text and color information is provided in the foreground layer in the 3-layer model, while in the N-layer model, text and color information is provided in N-layer(s)), in both of these MRC models, the background layer 12 holds background information of the image 100. In order to more effectively store MRC images, this disclosure proposes a method to determine and insert the background color value of the page of the image data in the metadata stream of the MRC image, either manually by a user or automatically by processing elements in a machine (e.g., while inputting or scanning a document in an MFD), thereby reducing the file size of the MRC image data to be stored (and later retrieved for output). In particular, with respect to input text documents such as forms, for example, such a method can ease the ability for a user to search image archives or memory for documents based on or having similar background color. Additional features and advantages of the method and system will become evident throughout the description below.

Figure 2:
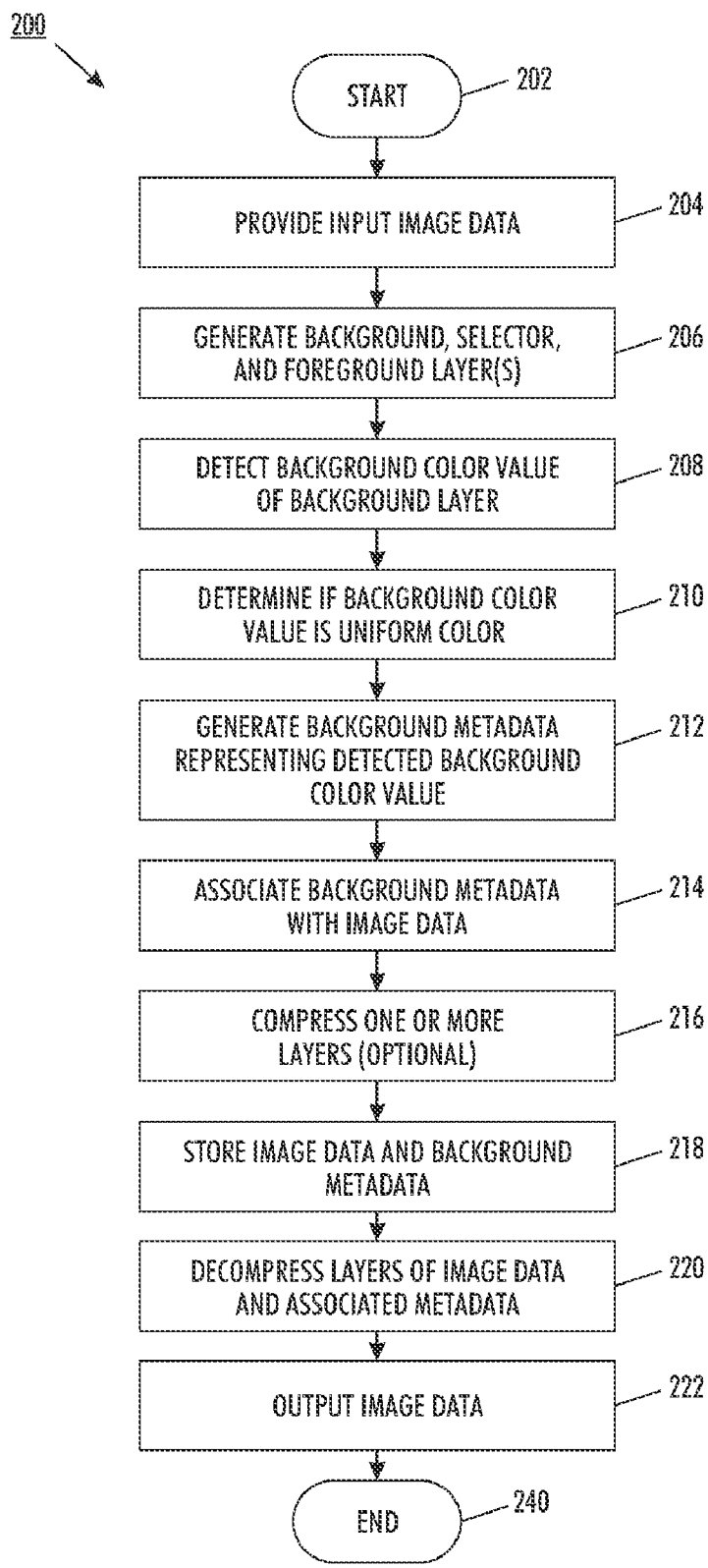
FIG. 2 illustrates a flow chart diagram illustrating a method for processing and storing image data in accordance with an embodiment of the present disclosure.

FIG. 2 illustrates a flow chart diagram illustrating a method 200 of processing and storing image data in accordance with an embodiment. As the method 200 is started at 202, input image data comprising a plurality of pixels is provided at 204. The image data may be provided or received as input, for example, by an image capture device. In embodiments, the image capture device may be an input device. As described below with respect to FIG. 3, an image capture device may be any type of device for providing input image data, such as a scanning device, facsimile device, computing device, storage device, etc. The input image data is then processed as shown by 206-214 to segment the image data into planes and prepare the image data for storage or archiving.

Specifically, at 206, the input image data is segmented to generate a background layer representing background attributes of the input image data (e.g., layer 12 of FIG. 1), a selector layer for identifying one or more foreground attributes of the input image data not included in the background layer (e.g., layer 10 of FIG. 1), and one or more foreground layers representing the foreground attributes of the input image data (e.g., layer 14 and optionally layer 16 of FIG. 1).

The MRC method or model chosen for separating provided input image data should not be limiting. For example, in embodiments, a 3-layer MRC model which uses a foreground, background, and mask layers may be used to obtain and separate the layers. In embodiments, an N-layer model may be used. Examples of segmentation algorithms used to generate MRC images that may be utilized in the method of this present disclosure include U.S. Pat. No. 7,242,802, entitled "Segmentation Method and System for Multiple Raster Content (MRC) Representation of Documents," issued Jul. 10, 2007, and U.S. Pat. No. 7,343,046, entitled "Systems and Methods for Organizing Image Data into Regions," issued on Mar. 11, 2008, both of which are assigned to the same assignee of the present disclosure, and both disclosure of which are incorporated herein by reference in their entirety. Further details regarding separation techniques are described below.

As previously noted, this method 200 is provided to process (i.e., compress and store) MRC images with background color information as an inserted metadata. More specifically, information relating to background planes comprising uniform color in images may be removed to reduce the file size of an MRC image when it is stored. As such, referring back to FIG. 2, the method 200 for processing the image data continues at 208 wherein a background color value of the background layer is detected. Optionally, at 210, it may be determined if the detected background color value is of uniform color. If the background color value is of uniform color, background metadata representing the detected background color value is generated at 212. Thereafter, the background metadata is associated with the input image data at 214.

If the background color value is not uniform, the background color values can be determined using other methods. For example, in some cases, a histogram of pixels for each of the background color plans may be generated, and the color plan with the most or largest occurrence (i.e., the color value that appears most often in the input image data) may be used as the detected background color value. Background metadata may then be generated based on the representative color value chosen from the histogram. U.S. Pat. Nos. 7,551,334 (entitled "Background Suppression Method and Apparatus") and 7,292,365 ("Methods and Systems for Determining Distribution Mean Level without Histogram Measurement"), which are also assigned to Xerox Corporation, are two examples which include embodiments for finding or detecting image background data which may be used in accordance with embodiments of this disclosure. In other embodiments, the pixels whose color appears most often in the image data of the page or document being processed may be used as the background color value. As such, it is noted that any number of methods may be used to determine and/or associate a background color value and thus background metadata with image data, and, therefore, the processes used to determine and/or associate background color values should not be limiting.

In some cases, after associating the background metadata with the segmented image data at 214, the image data may be optionally (further) compressed as shown by 216. Thereafter, the image data and background metadata may be stored together as shown by 218. The layers or planes of image data may be compressed using different compression techniques (e.g., such as JPEG and JBIG2, as noted above), but may be still stored together with the associated metadata. In an embodiment, the background metadata may be embedded or linked with the compressed image data. In embodiments, the background metadata may be associated with an image header of the image data when integrated into a data structure having machine-readable instructions that may be stored in a memory/storage unit, such as memory 310 and/or storage 312 shown in FIG. 3.

When outputting the saved image, the layers of image data may be decompressed at 220 with its associated background metadata and then output to an output device as represented by 222. An output device may be any type of device that is designed to output the image data and the mask, such as output device 316 of FIG. 3. For example, the output device may display, copy, print, or send the image data. Such an output device may be an MFD, for example. The output device may decompress the image data with its associated background metadata before output. Further description with regard to output devices is further provided below with respect to FIG. 3.

The above described method thus is able to describe an efficient and effective way to compress and store MRC images with the background color information as inserted metadata. The methods for detecting a background layer or plane in image data should not be limiting. The background color value and related information may be detected using known or existing background techniques, in some cases. For example, the techniques described in the '802 and '046 patents noted above may be used in accordance with embodiments. In another embodiment, the background layer and its information may be determined by using a method such as described in U.S. Pat. No. 7,302,097 B2, entitled "MRC Image Compression", and issued Nov. 27, 2007 to the same assignee, the disclosure of which is incorporated herein by reference in its entirety. For example, this '097 patent describes using background plane modification operation or techniques to remove the black text from the background image and create a smooth transitioned background plane. Such a background plane may be effectively processed using the above-described method 200.

In another embodiment, one technique or method for segmenting and detecting a background layer may include utilizing an MRC segmentation result and subsequent post processing operation to treat paper background and different objects separately. Such a method may include identifying and extracting photographic object(s) in a background layer so that the remaining regions of the background layer, i.e., the page background, may be separately identified. For example, in some methods, one may split the background layer into a background plane and a pictoral plane (e.g., a plane including photographic objects) to increase compressibility of image data. Specifically, such separation may provide the capability to detect if the paper background is white, uniform color, or non-uniform color. In some cases, then, the page background layer may be simply represented by a single color or constant value if it is uniform (e.g., rather than being compressed or coded as a single image with the noted object(s)). Thus, the extracted photographic object(s) may be processed in accordance with known techniques, and the page background layer in accordance with the herein disclosed method 200.

Yet another alternative and unlimiting way to capture the background color information of provided input image data in accordance with an embodiment of the present disclosure is to inspect the background layer of the MRC image. For example, inspection of the background layer could include (a) comparing variance of the image data values (i.e., of the pixel values) to a preset threshold via inspection of a pixel value histogram. Alternatively, for MRC images with the background plane compressed with JPEG, for example, inspection of the background layer could include (b) comparing variance of DC component values to a preset threshold value. As such, any of the above generally described concepts or other undescribed methods for determining separate layers (i.e., a background layer) to thereby generate background metadata may be used in the disclosed method for processing without limitation.

Extraction of the other layers, such as an optional layer in the form of a text layer, for example, should not be limiting. For example, in a 3-layer MRC model, the color of text is extracted in the foreground layer and compressed (e.g., using JPEG). In N-layer MRC models, text and pictoral layers can be separated, with the color of the text recorded separately. Alternatively, as another example, a 3+N MRC model may be used, wherein the text region is subdivided into N text layers based on the color of the text.

Furthermore, the method for associating the background metadata with the image data should not be limiting. As noted, the detected background color value may be stored in the metadata stream of the image header or an associated data file that would be created automatically. In an exemplary embodiment using PDF file output, the layers or planes of an MRC image are inserted as objects in a PDF file, and the metadata for the background value can be inserted in the metadata stream in the header of the file. In embodiments, this association may be done through automatic metadata insert option (e.g., offered by the processing elements of an MFD while the image is being scanned and created). In other embodiments, background metadata may be manually associated with image data by a user. For example, a user may fill in document background metadata directly, via a text editor or other appropriate editing tool. Such selection may be performed by selecting background metadata from a predetermined list saved in a memory storage unit (hardware or software), for example. Manual association may be used when a document is not scanned and/or processed automatically upon input, for example, or when a document has been previously provided (e.g., temporarily stored) without associated background metadata. Therefore, after an image has been created, a user may view a preview image before the file is actually stored and/or exported as output. The user may then manually determine and/or associate background metadata representing the detected background color value with the image data. In some instances, the user may want to make use of the background metadata to tag particular image data so that such image data (or page(s) or document(s)) are more easily found at a later time based on background features.

For other file formats, an associated data file or log is usually generated when an image is scanned or input which will hold at least this background information. One example type of file is an .xst job log file used by Xerox Corporation®. Again, the association of the background metadata representing the background color value of background layer of the image data can be performed automatically by the processing elements or processor of a MFD system, or manually (after the image has been input/scanned) by a user after viewing a preview image before the file is actually stored and/or exported.

In any case, this disclosure provides compression of images and encoding of associated background data to make the file smaller, thereby reducing file size of the image data. This is particularly useful for storage in a memory or storage device. Additionally, extracting the background color value information to populate a metadata field may also help in document processing workflows, such as document searching and/or categorization. For example, images can be catalogued and/or grouped based on the background color value information. Therefore, when a user wants to locate a pink form, for example, it may be more easily retrieved.

Figure 3:
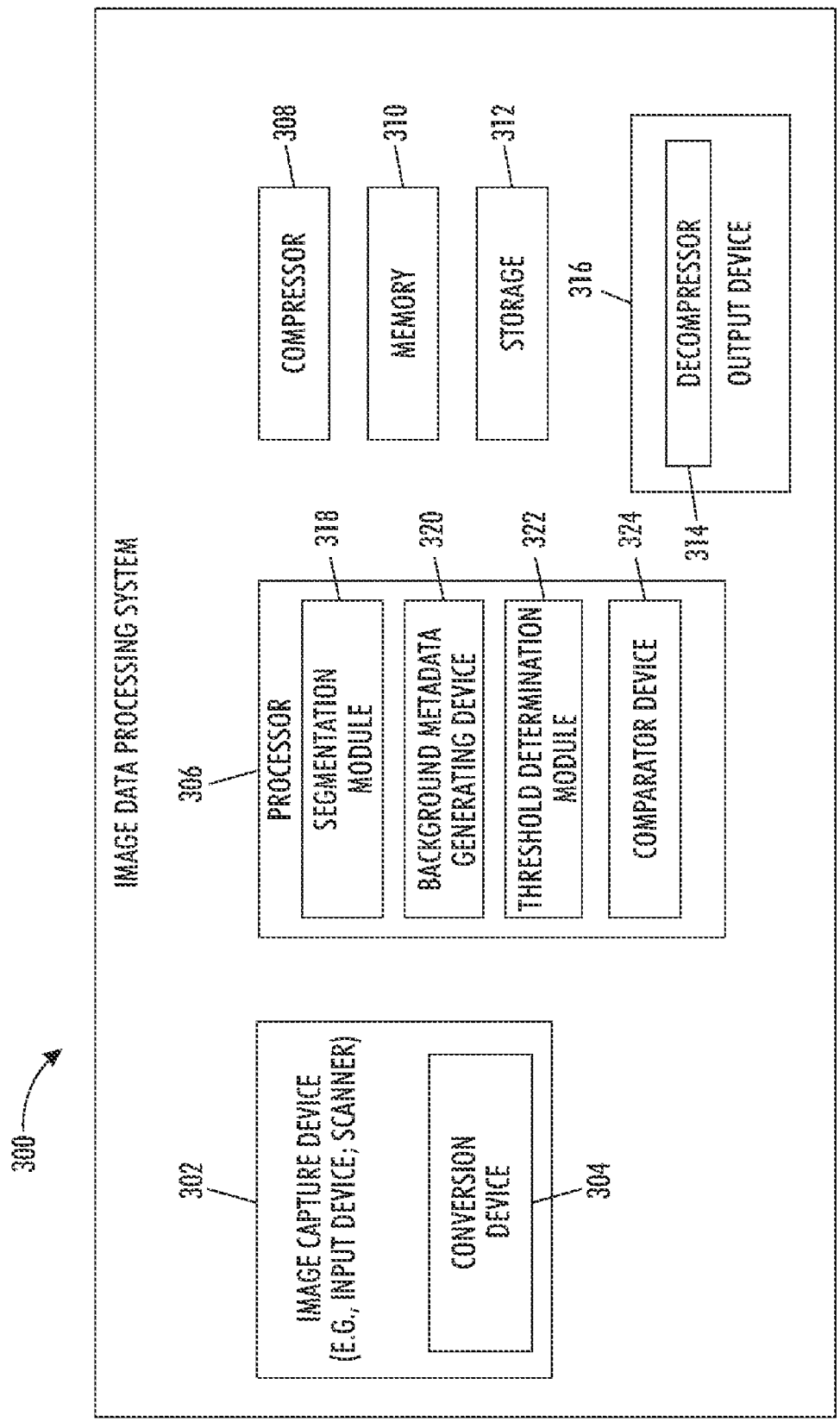
FIG. 3 is a block diagram illustrating an exemplary image data processing system that may be used to compress image data and generate background metadata in accordance with an embodiment of the present disclosure.

FIG. 3 illustrates a block diagram of an exemplary image data processing system 300 that may be used to compress image data and generate background metadata in accordance with an embodiment of the present disclosure. For example, the system 300 may comprise an image capture device 302, a processor 306, a compressor 308, memory 310 and/or storage 312, and an output device 314. Each of the devices shown in system 300 may also be considered modules, and, therefore, the terms "device" and "module" are used interchangeably herein. The image capture device 302 is configured to provide and/or receive image data, such as an input device. The image capture device 302 may comprise any type of device for providing, receiving and/or inputting image data, such as a an input image terminal, scanning device, facsimile device, computing device, copying device, MFD, storage device, etc. In an embodiment, the image capture device 302 may comprise a conversion device 304 for converting the image data, such as converting grayscale image data from an input device color space, such as RGB (red, green, blue), to a device independent processing color space, such as YCC, where intensity and color information are separated. Generally, the types of color spaces for image data and the conversion of such color spaces are known in the art. The conversion device 304 may be a part of the image capture device 302 or a separate device or module. At least one compressor 308 is provided in system 300, and is configured to compress the image data received by the image capture device 302 and processed by the processor 306. Compressor 308 may also optionally compress the segmented layers of the image data, as noted at 216 in method 200 of FIG. 2.

A processor 306 is configured to process pixels of the image data in order to separate or segment the input image data using a segmentation module 318 into layers via an MRC model, for example. As will become evident, the processor 306 (and its associated modules) may be used to perform or implement at least the steps 206-214 described above in method 200 of FIG. 2. The processor or processing elements may be a combination of image processing elements or modules which comprise software and hardware elements that may perform a number of operations on the image data received from the image capture device 302 using a set of parameters. The parameters may be used to convert the images to the format desired as output (e.g., high quality) along an image path. The elements may be a part of a computer system, device, or apparatus such as a xerographic system, a photocopier, a printing device, or a multi-function device (MFD). The elements or modules of the processor 306 are capable of executing machine executable program instructions. It is to be understood that any number of elements or modules may be used and that additional operations or processes besides those described below may be provided.

A background metadata generating device 320 is configured to generate background metadata representing the background color value associated with the image data. In an embodiment, the processor 306 may comprise the segmentation module 318 and/or the background metadata generating device 320, or, alternatively, the processor 306 may generate the background value and metadata information. Additionally, in some embodiments, additional modules may be provided in system 300. For example, a threshold determination module 322 and/or a comparator device 324 may be provided. Threshold module 322 may be used to determine the threshold value for processing the image data of the background layer. For example, threshold module 322 may provide a user-submitted threshold value or calculate a threshold value (e.g., based on historical data of the pixels of image data being process), or in some other manner. Comparator device 324 may be used to compare the image data to a threshold, for example. In an embodiment, background metadata generating device 320 may comprise a threshold module 92 and/or comparator device 324 therein to perform the above-noted processing steps, for example.

Memory 310 and/or storage 312 are storage devices for storing the image data and the associated background metadata, such as noted at 218 in method 200. An output device 316 may be provided to output the image data and the background metadata as noted at 222. Output device 316 may be any type of device that is designed to output the image data. For example, the output device may display, copy, print, or send the image data. Such an output device may be an MFD, printer, copier, scanner, facsimile device, display, a terminal, an image storage system, or CPU, for example. In an embodiment, the output device 316 may decompress the image data and its information in the background metadata before output. In an embodiment, a decompressor 314 is provided in system 300 to decompress the image data before sending the image data to output device 316, such as noted at 220 in method 200. The decompressor 314 and output device 316 may be the same module, or separate modules.

The processor 306 may execute machine readable executable instructions stored in memory 310 or storage 312. For example, the method described herein may be stored in the form of computer executable instructions so as to provide a computer readable media or data structure that may be executed by a computer to direct a computer to perform the method to reduce the file size of the MRC image data.

It should be noted that each of the above devices or modules shown in system 300 may be connected to, incorporated in, or communicate with any of the other modules and/or modules not shown. The above noted devices or modules of system 300 may also be separate and distinct. Also, the system and method may be used in different applications such as, for example, devices capable of providing output via digital printing for a multitude of purposes, including, but not limited to, xerographic systems, laser printing systems, ink jet printing systems, digital copiers and/or scanners, bookmaking machines, facsimile machines, and multi-function machines.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, it should be noted that the implemented MRC processing technologies should not be limiting. Other methods for determining background color values of image data may be used in accordance with embodiments of this invention.

Also, the number of processors or processing elements, and the performed acts by said processors or processing elements should also not be limiting. For example, it is to be understood that in some embodiments, the modules or processing devices as shown in FIG. 3 may be modules (or combined into one module) that are added to supplement an existing processing system or processor. Additionally, the claims can encompass embodiments in hardware, software, or a combination thereof. The disclosed embodiments may be provided in the form of a computer-readable storage medium which may include computer-readable instructions stored in any number of the noted elements such that, when executed by a processor(s), they are configured to implement a method 200 for processing image data.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A processor-implemented method for processing image data, the method comprising the following acts implemented by a processor:
    segmenting input image data to generate:
        (i) a background layer representing background attributes of the input image data;
        (ii) a selector layer for identifying one or more foreground attributes of the input image data not included in the background layer; and
        (iii) one or more foreground layers representing the foreground attributes of the input image data;
    detecting a background color value of the background layer;
    generating background metadata representing the detected background color value, and
    associating the background metadata with the segmented image data, such that the associated background metadata is in a searchable format.

2. The method according to claim 1, further comprising embedding or linking the background metadata with the image data.

3. The method according to claim 1, wherein the background metadata is associated with an image header of the image data.

4. The method according to claim 1, wherein the background metadata is provided in a log file of the image data when processed by the processor.

5. The method according to claim 1, wherein the method further comprises integrating the image data and background metadata into a data structure having machine-readable instructions that may be stored in a memory storage unit.

6. The method according to claim 1, wherein segmenting the input image data further includes: determining if the background color value of the background layer is uniform in color.

7. The method according to claim 1, further comprising: splitting the background layer into a background plane including color and a pictoral plane, and wherein the detecting of the background color value and generation of the background metadata representing the determined background color value is based on the background plane.

8. The method according to claim 1, further comprising outputting the image data via an output device.

9. The method according to claim 1, wherein the association of the background metadata with the image data is performed by the image capture device or processor.

10. The method according to claim 1, wherein the association of the background metadata with the image data is performed manually by selecting background metadata from a predetermined list saved in a memory storage unit.

11. The method according to claim 5, further comprising cataloging image data and its associated background metadata in the memory storage unit based on a determined background color value and storing the cataloged image data files based on the background color value information.

12. The method according to claim 11, further comprising retrieving image data based on its background color value and outputting the image data using an output device.

13. A system for processing image data, the system comprising:
    an image capture device for receiving image data;
    a processor configured to process the image data, the processor comprising at least one module comprising code executable by the processor to implement the following acts:
    segmenting the image data to generate:
        (i) a background layer representing background attributes of the input image data;
        (ii) a selector layer for identifying one or more foreground attributes of the input image data not included in the background layer; and
        (iii) one or more foreground layers representing the foreground attributes of the input image data;
    detecting a background color value of the background layer;
    generating background metadata representing the detected background color value, and
    associating the background metadata with the input image data, thereby reducing the file size of the MRC image data to be stored and retrieved for output, such that the associated background metadata is in a searchable format.

14. The system according to claim 13, wherein the processor is configured to embed or link the background metadata with the image data.

15. The system according to claim 13, wherein the background metadata is associated with an image header of the image data.

16. The system according to claim 13, wherein the background metadata is provided in a log file of the image data when processed by the processor.

17. The system according to claim 13, wherein the processor further implements the following act: integrating the image data and background metadata into a data structure having machine-readable instructions that may be stored in a memory storage unit.

18. The system according to claim 13, wherein segmenting the image data using the processor further includes: determining if the background color value of the background layer is uniform in color.

19. The system according to claim 13, wherein the processor further implements the followings acts: splitting the background layer into a background plane including color and a pictoral plane, and wherein the detecting of the background color value and generation of the background metadata representing the determined background color value is based on the background plane.

20. The system according to claim 13, further comprising an output device for outputting the image data.

21. The system according to claim 17, wherein the processor further catalogs image data and its associated background metadata into image data files based on a determined background color value, and wherein the image data files are stored in the memory storage unit based on the background color value information.

* * * * *